United States Patent
Kilsheimer et al.

[15] 3,689,658
[45] Sept. 5, 1972

[54] PESTICIDAL COMPOSITION COMPRISING A BENZOTHIENYL CARBAMATE AND SYNERGIST

[72] Inventors: John R. Kilsheimer, Westfield; Harold A. Kaufman, Piscataway, both of N.J.

[73] Assignee: Mobile Oil Corporation

[22] Filed: June 19, 1969

[21] Appl. No.: 834,869

Related U.S. Application Data

[63] Continuation-in-part of Ser. No. 559,408, June 22, 1966, abandoned.

[52] U.S. Cl. .................424/274, 424/275, 424/285
[51] Int. Cl. .................................................A01n 9/22
[58] Field of Search..............424/225, 285, 286, 274

[56] References Cited

UNITED STATES PATENTS 3,264,176   8/1966   Rapport....................424/125
3,288,673   11/1966   Kilsheimer et al.........424/275

OTHER PUBLICATIONS

Piquett et al., " J. Econ. Entomology, 59(4) p. 1020–1022 (1966)

Weiden et al., " J. Agr. Food Chem. 13(3) 200– 204 (1965)

*Primary Examiner*—Jerome D. Goldberg
*Assistant Examiner*—Vincent D. Turner
*Attorney*—Hayes, Oswald G., Hastings S. Trigg and Andrew L. Gaboriault

[57]   ABSTRACT

In the cases wherein the activity of a benzothienyl pesticide is low, the activity can be enhanced by using a combination of the benzothienyl carbamate and a synergist containing a 3,4-methylenedioxyphenyl group or an N-alkyl ($C_4$–$C_{16}$) bicycloheptene dicarboximide.

5 Claims, No Drawings

PESTICIDAL COMPOSITION COMPRISING A BENZOTHIENYL CARBAMATE AND SYNERGIST

CROSS-REFERENCE TO RELATED APPLICATIONS

This application is a continuation-in-part of copending application Ser. No. 559,408, filed June 22, 1966, now abandoned.

BACKGROUND OF THE INVENTION

1. Field of the Invention

This invention relates to pesticides having enhanced activity. It is more particularly concerned with pesticidal compositions comprising benzothienyl carbamates and synergists therefor.

2. Description of the Prior Art

In copending application Ser. No. 427,089, filed Jan. 21, 1965, now U.S. Pat. No. 3,288,808, and a continuation-in-part thereof Ser. No. 487,333, filed Sept. 14, 1965, now U.S. Pat. No. 3,288,673, there has been disclosed a novel class of benzothienyl carbamates. These carbamates have been demonstrated to possess, as a class, a broad range of activity as pesticides, e.g., insecticides, miticides, fungicides, and nematocides. As is to be expected, however, specific compounds within the class will vary in effectiveness. Thus, for example, 4-benzothienyl-N-methylcarbamate is highly effective against certain insects, such as the Mexican Bean Beatle and the Southern Armyworm. On the other hand, it is considerably less effective against the House Fly and the Two-Spotted Spider Mite. Other substituted derivatives and ring-position isomers thereof likewise are more effective against some pests and less effective against others.

It is the discovery of this invention that, in the areas of low activity, the effectiveness of benzothineyl carbamate pesticides can be enhanced by the addition of certain synergists, as hereinafter described.

SUMMARY OF THE INVENTION

The present invention provides a composition comprising a carrier for a pesticide, between about 0.05 weight per cent and about 10 weight per cent of a benzothineyl carbamate having the formula:

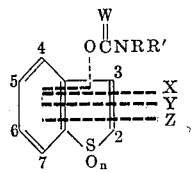

where R is selected from H, alkyl ($C_1$–$C_8$), cycloalkyl ($C_3$–$C_6$), and alkenyl ($C_2$–$C_8$); R' is selected from H, alkyl ($C_1$–$C_8$), alkenyl ($C_2$–$C_8$); phenyl, and halophenyl; X, Y, and Z are selected from hydrogen, chloro, nitro, alkyl ($C_1$–$C_4$), alkenyl ($C_2$–$C_4$), di($C_1$–$C_2$) alkylamino, methylmercapto, cyano (—CN), thiocyano (—S CN alkoxy (—$OCH_3$ to —$OC_8H_{17}$); W is selected from O and S; $n=0$, 1 or 2; i.e., $n$ is 0–2; and in which the carbamate radical (—OCWNRR') and X, Y, and Z may be on any separate 2–7 position of the ring; and the partially hydrogenated derivatives of said carbamates and between about one part and about ten parts by weight per one part by weight of said benzothienyl carbamate of a synergist selected from the group consisting of compounds containing a 3,4-methylenedioxyphenyl group and N-alkyl ($C_4$ to $C_{16}$) bicycloheptene dicarboximides.

DESCRIPTION OF SPECIFIC EMBODIMENTS

The benzothienyl carbamates utilizable in the synergistic compositions of this invention are fully described and extensively illustrated in applications by John. R. Kilsheimer and Harold A. Kaufman, Ser. No. 427,089 and 487,333, now U.S. Pat. Nos. 3,288,808 and 3,288,673. Accordingly, reference is to be made to Ser. Nos. 427,089 and 487,333 (U.S. Pat. Nos. 3,288,808 and 3,288,673) for description of these carbamates. The particularly preferred compounds are 4-benzothienyl-N-methylcarbamate; the 2,3,5,6, and 7 ring-position isomers thereof, i.e., 2-benzothienyl-, 3-benzothienyl-, 5-benzothienyl-, 6-benzothienyl-, and 7-benzothienyl-N-methylcarbamate; and derivatives of the foregoing having a methyl substituent on the ring, e.g., 7-methyl-4-benzothienyl-N-methylcarbamate.

Although the entire specifications of U.S. Pat. Nos. 3,288,808 and 3,288,673 are pertinent to the present invention, the portion that is particularly pertinent reads as follows:

The present invention provides N-alkyl, N-alkenyl, and N-aryl carbamates of benzothiophenes having the following generic formula:

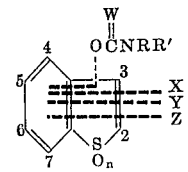

where R is selected from H, alkyl ($C_1$–$C_8$), cycloalkyl ($C_3$–$C_6$), and alkenyl ($C_2$–$C_8$); R' is selected from H, alkyl ($C_1$–$C_8$), alkenyl ($C_2$–$C_8$); phenyl, and halophenyl; X, Y, and Z are selected from hydrogen, halogen, nitro, alkyl ($C_1$–$C_4$), alkenyl ($C_2$–$C_4$), di($C_1$–$C_2$)alkylamino, methylmercapto, cyano(—CN), thiocyano (—SCN), alkoxy (—$OCH_3$ to —$OC_8H_{17}$); W is selected from O and S; $n=0$, 1 or 2, i.e., $n$ is 0–2; and in which the carbamate radical (—OCWNRR') and X, Y, and Z may be on any separate 2-7 positions of the ring; and the partially hydrogenated derivatives of said carbamates.

The following are typical compounds of this invention corresponding to the above generic formula:

2-benzothienyl-N-methylcarbamate
3-benzothienyl-N-methylcarbamate
4-benzothienyl-N-naphthylcarbamate
5-benzothienyl-N-methylcarbamate
6-benzothienyl-N-methylcarbamate
7-benzothienyl-N-methylcarbamate
7-dimethylamino-4-benzothienyl-N-methylcarbamate
7-diethylamino-4-benzothienyl-N-methylcarbamate
3-dimethylamino-4-benzothienyl-N-methylcarbamate    6-methyl-7-dimethylamino-4-benzothienyl-N-methylcarbamate
3-isopropoxy-4-benzothienyl-N-methylcarbamate
7-isopropoxy-4-benzothienyl-N-methylcarbamate 6-methyl-7-methoxy-4-benzothienyl-N-methylcarbamate
3-methyl-4-benzothienyl-N-methylcarbamate
7-ethyl-4-benzothienyl-N-methylcarbamate
2-ethyl-4-benzothienyl-N-methylcarbamate
7-methylmercapto-4-benzothienyl-N-methylcarbamate
5-allyl-4-benzothienyl-N-methylcarbamate
7-nitro-4-benzothienyl-N-methylcarbamate
2-cyano-4-benzothienyl-N-methylcarbamate
7-cyano-4-benzothienyl-N-methylcarbamate
7-thiocyano-4-benzothienyl-N-methylcarbamate
2-chloro-4-benzothienyl-N-methylcarbamate
3-chloro-4-benzothienyl-N-methylcarbamate
5-chloro-4-benzothienyl-N-methylcarbamate
6-chloro-4-benzothienyl-N-methylcarbamate
7-chloro-4-benzothienyl-N-methylcarbamate
2,3-dichloro-4-benzothienyl-N-methylcarbamate
2,3,5,6,7-pentachloro-4-benzothienyl-N-methylcarbamate
2-iodo-4-benzothienyl-N-methylcarbamate
3-bromo-4-benzothienyl-N-methylcarbamate
3-benzothienyl-N-ethylcarbamate
4-benzothienyl-N-2-ethylhexylcarbamate
4-benzothienyl-N-n-butylcarbamate 4-benzothienyl-N-n-octylcarbamate
4-benzothienyl-N,N-dimethylcarbamate
4-benzothienyl-N-phenylcarbamate
4-benzothienyl-N-chlorophenylcarbamate
4-benzothienyl-N-phenylthionocarbamate
1,1-dioxy-4-benzothienyl-N-methylcarbamate
1,1-dioxy-3-benzothienyl-N-methylcarbamate
1-oxy-4-benzothienyl-N-methylcarbamate
1-oxy-3-benzothienyl-N-methylcarbamate
4,5,6,7-tetrahydro-4-benzothienyl-N-methylcarbamate
2,3-dihydro-4-benzothienyl-N-methylcarbamate
2,3-dihydro-7-methyl-4-benzothienyl-N-methylcarbamate
2,3-dihydro-7-methylmercapto-4-benzothienyl-N-methylcarbamate
2,3-dihydro-5-chloro-4-benzothienyl-N-methylcarbamate.

The compounds of this invention can be made using various procedures. A convenient method generally applicable provides for the synthesis of a hydroxybenzothiophene as an intermediate and this compound is then converted to the N-alkyl or N,N-dialkyl carbamates, or the equivalent alkenyl or aryl carbamates, or carbamic acid.

Typically, 4-hydroxybenzothiophene is made according to the multistep of Fieser and Kennelly (Journal of the American Chemical Society, 57, page 1615, 1935).

The following examples in which parts are by weight, illustrate these syntheses in detail:

EXAMPLE 1

The N-methylcarbamate derivative of the benzothiophene is made as follows: a reaction vessel equipped with a condenser and drying tube is charged with 140 parts 4-hydroxybenzothiophene, 61 parts methyl isocyanate, 1 part dibutyltin diacetate and 225 parts toluene. The solution is agitated at room temperature for 24 hours using a stirrer. The solution is then chilled and 150 parts of solid product is obtained. This material has a melting point of 129°C. an analyzes as follows:

| | Theory | Found |
|---|---|---|
| Carbon, wt. percent | 57.9 | 57.8 |
| Hydrogen, wt. percent | 4.4 | 3.8 |
| Nitrogen, wt. percent | 6.8 | 6.8 |

The infrared spectrum of the product is also consistent with the structure 4-benzothienyl-N-methylcarbamate.

The reaction of this example can be illustrated as follows:

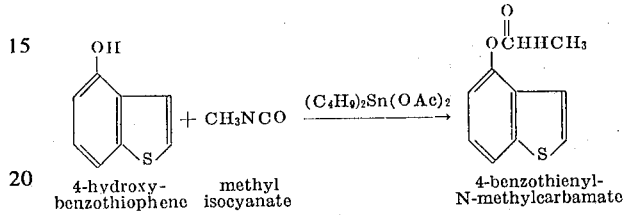

4-hydroxy-benzothiophene + methyl isocyanate → 4-benzothienyl-N-methylcarbamate

EXAMPLE 2

The product of Example 1 can also be synthesized by the reaction of 4-hydroxybenzothiophene (A) with phosgene (B) in the presence of a base (e.g., alkali metal hydroxides or organic tertiary amines such as pyridine and triethyl amine) to give 4-benzothienyl chloroformate (C) and then the further reaction of this intermediate with methylamine (D) to yield the product 4-benzothienyl-N-methylcarbamate (E). This series of reactions is shown below:

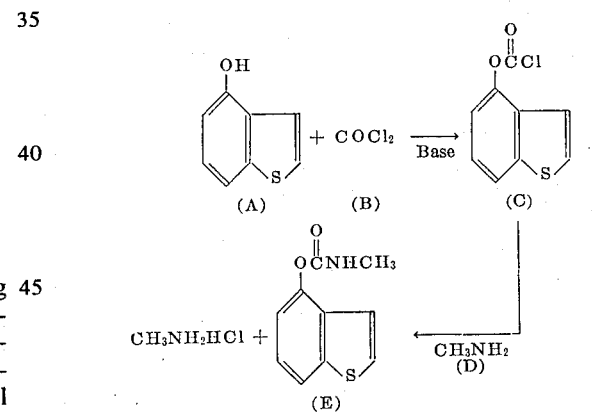

Other amines may be used in place of the methylamine (D) to give other corresponding carbamates, e.g., cyclohexylamine, crotyl amine, allyl amine and the like.

The following is a more detailed description of the process of this example:

To an agitated mixture of 128 parts (1.3 M) of phosgene in 300 parts of toluene is added a solution of 150 parts (1.0 M) of 4-hydroxybenzothiophene and 127 parts (1.05 M) of N,N-dimethylaniline in 600 parts of toluene. The reaction mixture is then stirred at 30°C. for 1 hour. The mixture is cooled to 20°C. and added slowly to 600 parts of water maintained at 5–10°C. The excess phosgene is thus hydrolyzed and the N,N-dimethylaniline hydrochloride is removed in the aqueous phase. The oily layer is stripped of toluene at reduced pressure and the 4-benzothienyl chloroformate product is purified by distillation.

To a stirred solution of 212 parts (1.0 M) of the 4-benzothienyl chloroformate in 800 parts of toluene is added 310 parts (2 M) of 20 percent aqueous monomethylamine. The reaction mixture is stirred at 10°–15C. for 30 minutes to complete the reaction. The solid product is separated by filtration, washed thoroughly with water to remove all the methylamine hydrochloride, then washed with toluene and air dried. The 4-benzothineyl-N-methylcarbamate so obtained melts at 129°C. The yield is on the order of 90 percent.

In the synergistic compositions of this invention, along with the synergist and a suitable liquid or solid carrier, the benzothienyl carbamate is used in amounts of between about 0.05 weight per cent and about 10 weight per cent.

The compounds that act as synergists for these benzothienyl carbamates are compounds containing the 3,4-methylenedioxyphenyl group and N-alkyl-bicycloheptene dicarboximides having four to 16 carbon atoms in the alkyl group. Typical compounds include 2-(2-n-butoxyethoxy)ethyl-3,4-methylenedioxybenzoate; 2-(3,4-methylenedioxyphenoxy)-3,6,9-trioxyundecane; 1,2-methylenedioxy-4-[2(octylsulfinyl)propyl] benzene; 3,4-methylenedioxy-6-propyl-benzyl butyl diethyleneglycol ether; piperonyl cyclonene; di-n-propyl 6,7-methylenedioxy-3-methyl-1,2,3,4-tetrahydronaph-thylene-1,2-dicarboxylate; 2,6-bis (3,4-methylenedioxyphenyl)-3,7-dioxabicyclo [3.3.0] octane; N-butyl-bicyclo-(2,2,1)-5-heptene-2,3-dicarboximide; N-(2-ethylhexyl)-bicyclo(2,2,1)-5-heptene-2,3-dicarboximide; N-dodecyl-bicyclo-(2,2,1)-5-heptene-2,3-dicarboximide; and N-hexadecylbicyclo-(2,2,1)-5-heptene-2,3-dicarboximide.

In the synergistic combinations of this invention, the relative proportions of the components can vary between about 0.5 and about 20 parts by weight of the synergist per one part by weight of the benzothienyl carbamate. Preferably, the proportions will be between about one and about 10 parts by weight of synergist per one part by weight of the carbamate.

The synergistic compositions of this invention are especially potent pesticides when used to control or combat important agricultural and household pests, including insects and mites. These synergistic compositions can be used in various ways to achieve biological action. They can be applied per se, as solids or in vaporized form, but are preferably applied as to toxic components in pesticidal composites of the synergistic composition and a liquid or solid carrier. The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the pesticidal composites. Non-limiting examples of liquid carriers include water; organic solvents such as alcohols, ketones, amides, and esters; mineral oils such as kerosene, light oils, medium oils; and vegetable oils such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

The amount of the synergistic compositions of this invention utilized in pesticidal composites will vary rather widely. It depends to some extent upon the type of composit in which the material is being used, the nature of the condition to be controlled, and the method of application (i.e., spraying, dusting, etc.). In general, composites, as applied, containing about 0.15 weight per cent synergistic combination in either liquid or solid carrier give excellent results. In some cases, however, stronger dosages up to about 10 weight per cent or even up to about 20 weight per cent may be required.

In practice, pesticidal composites are usually prepared in the form of concentrates, which may be diluted to different concentrations for particular applications. For example, the concentrate can be a wettable powder containing large amounts of a synergistic combination of this invention, a carrier (e.g., attapulgite or other clay), and wetting and dispersing agents. Such powders can be diluted prior to application, by dispersing it in water to obtain a sprayable suspension containing the concentration of pesticide desired for application. Other concentrates can be solutions that can be later diluted, e.g., with kerosene. Other desirable concentrates will be mixed with liquified, normally gaseous hydrocarbons or fluorocarbons and propelled as a fine spray from a pressurized can. Thus, it is within the contemplation of this invention to provide pesticidal composites containing up to about 80 per cent, by weight of the composite, of a synergistic combination of this invention. Accordingly, depending upon whether it is ready for application or it is in concentrated form, the contemplated pesticidal composites can contain between about 0.15 per cent and about 80 per cent, by weight of the composite, of a synergistic combination of this invention and a carrier, liquid or solid, as defined hereinbefore.

INSECTICIDE

A series of tests were carried out using 4-benzothienyl-N-methylcarbamate (Carbamate) alone and in combination with a synergist; (1) 3,4-methylenedioxy-6-propylbenzyl butyl diethyleneglycol ether (piperonyl butoxide), (2) 1,2-methylenedioxy-4- [2(octylsulfinyl)propyl] benzene (Sulfoxide), or (3) N-(2-ethylhexyl)-bicyclo-(2,2,1)-5-heptene-2,3-dicarboximide (MGK 264). Tests were also carried out using each synergist alone. In each test, housefly adults, confined in spherical wire mesh cages mounted in an insect toximeter, were subjected to 1 ml. of an atomized solution of each chemical dissolved in cyclohexanoneultrasene (deodorized kerosene) (25:75 volume per cent) at concentrations of each chemical as set forth in Table I. The flies are then transferred to observation cages. Mortality is noted 24 hours after application. Pertinent data and test results are set forth in Table I.

TABLE I

| Treatment | Conc., ppm. | Average % Mortality |
|---|---|---|
| Carbamate | 1000 | 48.8 |
| Piperonyl Butoxide | 5000 | 0.0 |
| Sulfoxide | 5000 | 0.0 |
| MGK 264 | 5000 | 0.0 |
| Carbamate + Piperonyl Butoxide | 1000 5000 | 78.8 |
| Carbamate + Sulfoxide | 1000 5000 | 81.3 |

MITICIDE

The compounds of Table I were tested separately and in combination in a series of tests on the Two-Spotted Spider Mite. Solution of the compound and combination thereof, at concentrations shown in Table II, were prepared using a solvent system of acetone (97.5 percent) and surfactive agents, 2 percent Span 85 (sorbitan trioleate) and 0.5 percent Tween 80 (polyoxyalkylene derivative of sorbitan monooleate).

Cranberry bean plants infested with adult two-spotted spider mites were dipped in the respective formulations and allowed to dry. Treated plants were maintained under greenhouse conditions for 72 hours and then observed for per centage mortality and plant injury. Three replicates are used for each level of application.

Typical test results with pesticide compositions contemplated herein are set forth in Table II.

TABLE II

| Treatment | Conc., ppm. | % Mortality 72 hours |
|---|---|---|
| Carbamate | 1000 | 35.3 |
| Piperonyl Butoxide | 1000 | 6.1 |
| Carbamate + Piperonyl Butoxide | 1000 1000 | 88.4 |
| Sulfoxide | 1000 | 20.0 |
| Carbamate + Sulfoxide | 1000 1000 | 100.0 |
| Carbamate + Sulfoxide | 500 1000 | 94.6 |
| MGK 264 | 1000 | 26.4 |
| Carbamate + MGK 264 | 1000 1000 | 100.0 |
| Carbamate + MGK 264 | 500 1000 | 81.3 |
| Carbamate + MGK 264 | 1000 5000 | 65.5 |

From the data in the tables, it will be appreciated that the combination of 4-benzothienyl-N-methylcarbamate and synergist gave pesticidal results superior to either material alone. Synergism is shown from the fact that the effect was considerably more than the additive effect of the two materials in each combination.

Although the present invention has been described with preferred embodiments, it is to be understood that modifications and variations may be resorted to, without departing from the spirit and scope of this invention, as those skilled in the art will readily understand.

WHAT IS CLAIMED IS:

1. An insecticidal and miticidal composition comprising a liquid or solid carrier, an effective amount between about 0.05 weight per cent and about 10 weight per cent of a benzothienyl carbamate having the formula:

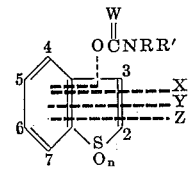

where R is selected from the group consisting of H, $C_1$-$C_8$ alkyl, $C_3$-$C_6$ cycloalkyl, and $C_2$-$C_8$ alkenyl; R' is selected from the group consisting of H, $C_1$-$C_8$ alkyl, $C_2$-$C_8$ alkenyl, phenyl, and halophenyl; X, Y, and Z are selected from the group consisting of hydrogen, chloro, nitro, $C_1$-$C_4$ alkyl, $C_2$-$C_4$ alkenyl, $C_1$-$C_2$ dialkylamino, methylmercapto, cyano, thiocyano, and $C_1$-$C_8$ alkoxy; W is O or S; $n=0$, 1 or 2; and in which the carbamate radical and X, Y, and Z may be on any separate 2–7 positions of the ring; or the partially hydrogenated derivatives of said carbamates; and an effective amount of a synergist selected from the group consisting of compounds containing a 3,4-methylenedioxyphenyl group and N-$C_4$-$C_{16}$ alkyl bicycloheptene dicarboximides.

2. A composition as defined in claim 1, wherein said carbamate is 4-benzothienyl-N-methylcarbamate.

3. A composition as defined in claim 2, wherein said synergist is 3,4-methylenedioxy-6-propylbenzyl butyl diethyleneglycol ether.

4. A composition as defined in claim 2, wherein said synergist is 1,2-methylenedioxy-4-[2(octylsulfinyl)propyl]-benzene.

5. A composition as defined in claim 2, wherein said synergist is N-(2-ethylhexyl)-bicyclo-(2,2,1)-5-heptene-2,3-dicarboximide.

* * * * *